E. W. WEBB.
ROLLER BEARING FOR CARS.
APPLICATION FILED MAY 20, 1914.
1,137,038.
Patented Apr. 27, 1915.
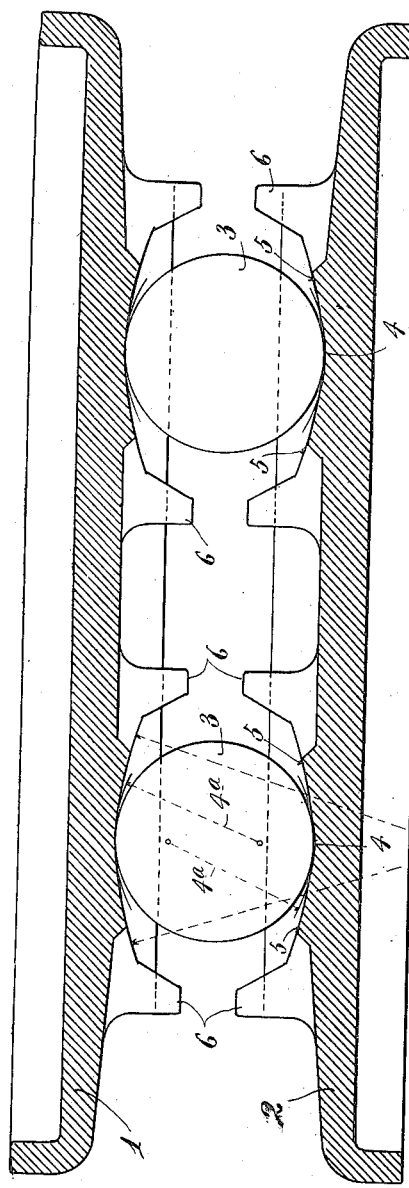
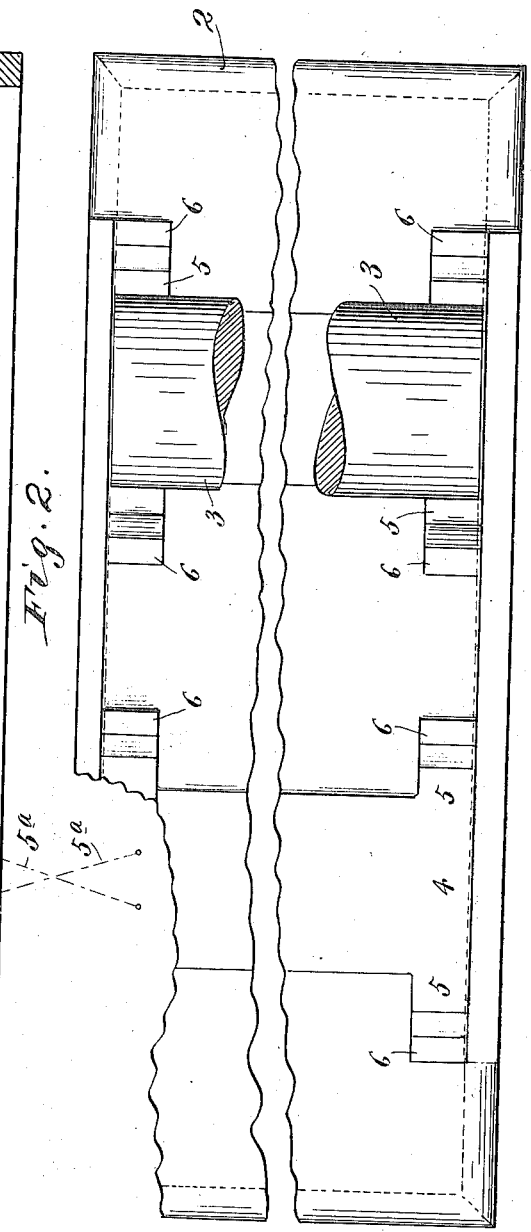

UNITED STATES PATENT OFFICE.

EDWIN W. WEBB, OF CHICAGO, ILLINOIS, ASSIGNOR TO STANDARD CAR TRUCK COMPANY, OF CHICAGO, ILLINOIS, A CORPORATION OF NEW JERSEY.

ROLLER-BEARING FOR CARS.

1,137,038.     Specification of Letters Patent.     Patented Apr. 27, 1915.

Application filed May 20, 1914. Serial No. 839,701.

*To all whom it may concern:*

Be it known that I, EDWIN W. WEBB, a citizen of the United States, residing at Chicago, in the county of Cook and State of Illinois, have invented certain new and useful Improvements in Roller-Bearings for Cars; and I do hereby declare the following to be a full, clear, and exact description of the invention, such as will enable others skilled in the art to which it appertains to make and use the same.

My invention has for its object to provide an improved roller bearing device for cars, especially adapted for use to permit lateral movements of the car body in respect to the car trucks, and vice versa; and to such ends, generally stated, the invention consists of the novel devices and combinations of devices hereinafter described and defined in the claims.

In the so-called Barber lateral motion trucks, which are now in extensive use throughout the United States and elsewhere, lateral motion rollers are interposed between upper and lower bearing plates or members, having one form or other of concave roller seats that coöperate with the rollers to yieldingly maintain the car body in a laterally centered intermediate position. My invention is particularly designed as an improvement on, or modification of, this general type of lateral motion roller bearing device.

Roller bearing seats of true cylindrical form have been found satisfactory in cars where a lateral motion was not greater in extent than one inch, but they have not been found satisfactory in the larger and heavier cars requiring three or four inches of lateral movement. The reason for this is that if the radius of the cylindrical surface was made great enough to prevent acceleration in the resistance under extreme movements, then the intermediate portions of such cylindrical surfaces would so closely approximate a horizontal or flat surface that there would be too slight resistance to initial movements of the rollers from normal intermediate positions.

In practice I have found that the best results can be obtained only by forming the concave roller engaging surfaces of the upper and lower bearing plates or members each on the lines of several curves, and with the said curves so arranged that there will be a considerable resistance against movements of the rollers from their normal centered positions, and under extreme movements of the rollers will be a nearly constant but slightly increasing resistance to such movements of the rollers.

In the accompanying drawings, which illustrate the invention, like characters indicate like parts throughout the several views.

Referring to the drawings, Figure 1 is a vertical section, taken through the improved roller bearing devices, some parts being shown in diagram; and Fig. 2 is a plan view with some parts broken away, showing the lower roller bearing plate in one of the rollers.

The numeral 1 indicates the upper roller bearing plate, the numeral 2 the lower roller bearing plate and the numeral 3 the interposed bearing rollers. These bearing plates are formed with roller bearing surfaces, the intermediate portions of which are in the form of a cylindrical surface 4, and the outer portions of which are in the form of cylindrical surfaces 5 that tangentially join the said intermediate cylindrical surface 4. The said intermediate cylindrical surface 4 has a radius, indicated by the dotted line 4ª in Fig. 1, that is slightly greater than the radius of the coöperating roller 3. For example, if the radius of the roller 3 is one inch, then the radius of the surface 4 may be one and one-half inches and the radii of the cylindrical surfaces 5 would preferably be about four and one-half inches, as indicated by the dotted lines 5ª. It is important also to note that the radii 5ª of said cylindrical surfaces 5 are not struck from the same center, but are offset so that they cross a vertical line drawn through the normal axis of the roller 3 and the axis of the radii 4ª. This has the effect of giving greater inclinations to the said surfaces 5. This greater inclination of the said surfaces 5 gives the proper resistance to lateral movements with the said surfaces struck from long radii, and furthermore, has the effect of causing the said surfaces to be more quickly effective to resist lateral movements of the rollers. For engagement with the ends of the rollers, the bearing plates 1 and 2 are provided with stops lugs 6 which limit the extreme traveling movements of the said rollers and of the bearing plates in respect to each other.

The improved roller bearing described is especially designed and particularly adapted for use as a lateral motion bearing for cars, but is capable of more general use.

What I claim is:

1. A roller bearing device comprising upper and lower bearing plates and interposed rollers, said bearing plates having roller engaging surfaces, each formed by an intermediate curved surface of slightly greater radius than the coöperating roller, and by outer curved surfaces of very much greater radii tangentially joining the said intermediate curved surfaces.

2. A roller bearing device comprising upper and lower bearing plates and interposed rollers, said bearing plates having roller engaging surfaces, each formed by an intermediate curved surface of slightly greater radius than the coöperating roller, and by outer curved surfaces of very much greater radii, tangentially joining the said intermediate curved surfaces, the relatively long radii intersecting each other and having their axes off-set on opposite sides of the vertical line which intersects the axis of said intermediate curved surfaces.

3. A roller bearing device comprising upper and lower bearing plates and interposed rollers, said bearing plates having roller engaging surfaces formed by curved tangential surfaces of different radii, and the said bearing plates having roller engaging stops at the outer extremities of said outer curved roller engaging surfaces.

4. A roller bearing device comprising upper and lower bearing plates and interposed rollers, said bearing plates having roller engaging surfaces, each formed by an intermediate curved surface of slightly greater radius than the coöperating roller, and by outer curved surfaces of very much greater radii, tangentially joining the said intermediate curved surfaces, the relatively long radii intersecting each other and having their axes off-set on opposite sides of the vertical line which intersects the axis of said intermediate curved surfaces, and the said bearing plates having roller engaging stops at the outer extremities of said outer curved roller engaging surfaces.

In testimony whereof I affix my signature in presence of two witnesses.

EDWIN W. WEBB.

Witnesses:
LEE W. BARBER,
MABEL G. LAW.